United States Patent [19]
Chien

[11] Patent Number: 5,437,104
[45] Date of Patent: Aug. 1, 1995

[54] LASER SIGHT MOUNTING DEVICE FOR MOUNTING A LASER SIGHT ON THE FLASH ATTACHMENT OF A CAMERA

[75] Inventor: Yen-Jen Chien, Taipei, Taiwan

[73] Assignee: Simpatico Industries Co., Ltd., Taipei, Taiwan

[21] Appl. No.: 285,827

[22] Filed: Aug. 4, 1994

[51] Int. Cl.6 .................... G03B 13/04; F21V 21/00
[52] U.S. Cl. ...................................... 33/266; 33/286; 33/DIG. 21; 362/119; 362/259
[58] Field of Search ................ 33/266, 241, 263, 286, 33/DIG. 21; 362/119, 109, 110, 234, 253, 259

[56] References Cited

U.S. PATENT DOCUMENTS

| | | | |
|---|---|---|---|
| 1,215,171 | 2/1917 | Lewis | 33/241 |
| 1,684,821 | 9/1928 | Eastman | 33/266 |
| 2,337,463 | 12/1943 | Hall | 33/266 |
| 3,867,764 | 2/1975 | Dunmire et al. | 33/241 |
| 3,873,823 | 3/1975 | Northrup et al. | 33/286 |
| 4,212,109 | 7/1980 | Snyder | 33/241 |
| 4,479,169 | 10/1984 | Holmes | 362/119 |
| 4,916,579 | 4/1990 | Simms | 362/259 |
| 5,255,167 | 10/1993 | Toussaint et al. | 362/259 |

*Primary Examiner*—Christopher W. Fulton
*Attorney, Agent, or Firm*—Jacobson, Price, Holman & Stern

[57] ABSTRACT

A laser sight mounting device including a mounting block, which has a mounting foot at the bottom for fastening to the flash attachment of a camera, a flash attachment at the top for mounting an electronic flash, a longitudinal center through hole, which receives the laser module of a laser sight, a longitudinal mounting groove inside the longitudinal center through hole, and a side screw hole; a first spring plate mounted inside the longitudinal mounting groove; a second spring plate mounted within the flash attachment of the mounting block to hold down the electronic flash; and a tightening up screw threaded into the screw hole to press the first spring plate causing it to hold down the laser module.

3 Claims, 1 Drawing Sheet

LASER SIGHT MOUNTING DEVICE FOR MOUNTING A LASER SIGHT ON THE FLASH ATTACHMENT OF A CAMERA

BACKGROUND OF THE INVENTION

The present invention relates to a laser sight mounting device which comprises a mounting block fastened to the flash attachment of a camera to hold the laser module of a laser sight by a tightening up screw and a spring plate. The mounting block has a flash attachment with a spring plate for mounting an electronic flash.

While taking a picture or pictures by a camera or sound movie camera, the focus must be accurately adjusted and aimed at the object by adjusting the focusing ring or manual zoom lever. However, accurately adjusting the focus of a camera requires certain techniques. Therefore, only experienced persons can accurately adjust the focus of the cameras. If the focus is not accurately focused, the picture obtained will not be clearly seen. There is disclosed a laser sight designed to guide the eye. The laser sight is comprised of a laser module having a self-provided battery power supply on the inside, a press-button switch connected to the laser module by an electric wire and controlled to trigger the laser diode of the laser module causing it to emit a laser beam for directing at the object. This structure of laser sight greatly helps non-experience persons direct at the object thing while taking a picture. However, because the laser sight has no means to attach to a camera, the user finds it difficult to hold the laser module in position while using the camera.

SUMMARY OF THE INVENTION

The present invention eliminates the aforesaid problem. According to the preferred embodiment of the present invention, the laser sight mounting device comprises a mounting block, a tightening up screw, a first spring plate, and a second spring plate. The mounting block comprises a mounting foot at the bottom for fastening to the flash attachment of a camera, a flash attachment at the top for mounting an electronic flash, a longitudinal center through hole, which receives the laser module of a laser sight, a longitudinal mounting groove inside the longitudinal center through hole, which receives the first spring plate, and a side screw hole, into which the tightening up screw is threaded to press the first spring plate causing it to hold down the laser module. The second spring plate is mounted within the flash attachment of the mounting block to hold down the electronic flash. Because the flash attachment of the camera is disposed near and in parallel with the lens, when the laser beam of the laser sight is directed at the object, the focus of the camera is directed at the object. Because the mounting block of the laser sight mounting device has a flash attachment at the top for holding an electronic flash, the installation of the laser sight does not affect the installation of an electronic flash.

DETAILED DESCRIPTION OF THE PREFERRED EMBODIMENT

Figure 1:
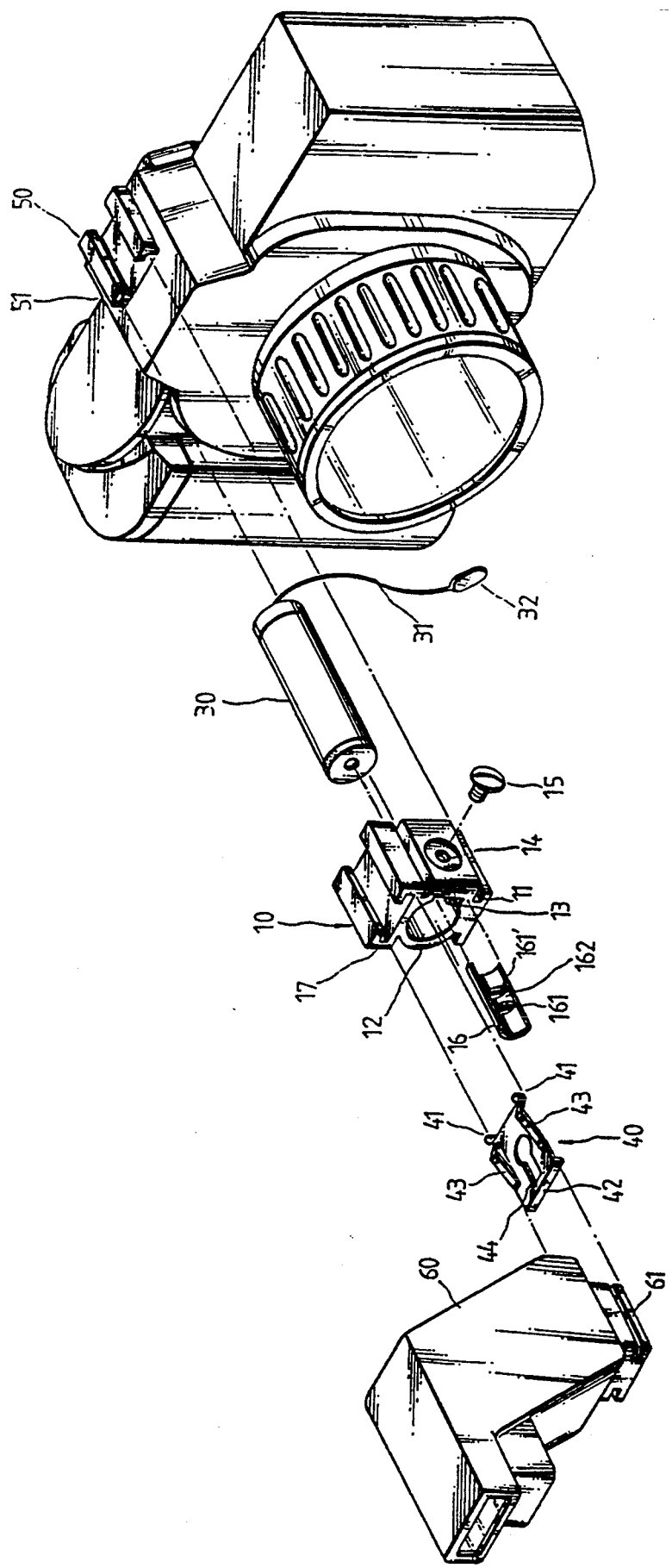
FIG. 1 is the drawing of the present invention, showing the structure of the laser sight mounting device.

Referring to FIG. 1, the present invention is generally comprised of a mounting block 10, a tightening up screw 15, and two spring plates 16 and 40. The mounting block 10 comprises a T-shaped mounting foot 11 at the bottom for coupling to the track 51 of the flash attachment 50 of a camera, a longitudinal center through hole 12 for holding the laser module 30 of a laser sight, a longitudinal mounting groove 13 inside the center through hole 12, which receives the spring plate 16, a screw hole 14 perpendicularly through the longitudinal mounting groove 13, into which the tightening up screw 15 is threaded, and a flash attachment 17 at the top for coupling the mounting foot 61 of an electronic flash 60. The spring plate 16 is shaped like a half-round bar having two transverse projecting portions 161 and 161' spaced by a spacing portion 162. When the tightening up screw 15 is threaded into the screw hole 14, the threaded shank of the tightening up screw 15 is stopped against the spacing portion 162 between the two projecting portions 161 and 161' to stop the spring plate 16 from axial movement. When the laser module 30 is inserted into the center through hole 12, the tightening up screw 15 is threaded tight causing the spring plate 16 to hold down the laser module 30 inside the center through hole 12 of the mounting block 10.

The spring plate 40 is mounted within the flash attachment 17. When the mounting foot 61 of an electronic flash 60 is fastened to the flash attachment 17, the spring plate 40 gives an upward pressure to the bottom of the mounting foot 61 of the electronic flash 60 causing the electronic flash 60 firmly retained in position. The spring plate 40 is punched from a flat resilient plate having upward projections 41 bilaterally disposed at the rear side and respectively hooked on the back of the flash attachment 17, a downward flange 42 transversely disposed at the front side and hooked on the front of the flash attachment 17, two curved portions 43 bilaterally stopped inside the flash attachment 17 to hold down the spring plate 40 in position, and a through hole 44, which receives the contact (not shown) on the mounting foot 61 of the electronic flash 60.

Referring to FIG. 1 again, when the mounting foot 11 of the mounting block 10 is fastened to the track 51 of the flash attachment 50 of the camera, the laser module 30 of the laser sight is inserted into the center through hole 12 of the mounting block 10 and then fixed in place by screwing tight the tightening up screw 15, then the mounting foot 61 of the electronic flash 60 is fastened to the flash attachment 17 of the mounting block 10. When installed, the electronic flash 60 is electrically fastened to the flash attachment 50 of the camera by the mounting block 10, and the laser module 30 of the laser sight is firmly retained in the mounting block 10. By controlling the switch 32 of the laser sight which is connected to the circuit of the laser module 30 by an electric wire 31, the laser module 30 is turned on to emit a laser beam for directing at the target.

What is claimed is:

1. A laser sight mounting device comprising:
a mounting block having a mounting foot at the bottom for fastening to the flash attachment of a camera, a flash attachment at the top for mounting the mounting foot of an electronic flash, a longitudinal center through hole located at the center of said mounting block, which receives the laser module of a laser sight, a longitudinal mounting groove located inside said longitudinal center through hole, a side screw hole perpendicularly through said longitudinal mounting groove;

a first spring plate mounted within said longitudinal mounting groove;

a second spring plate mounted within said flash attachment of said mounting block for holding down the mounting foot of the electronic flash being fastened to said mounting block; and a tightening up screw having a threaded shank threaded into said screw hole to press said first spring plate causing said first spring plate to hold down the laser module in said longitudinal center through hole.

2. The laser sight mounting device of claim 1 wherein said first spring plate comprises two transverse projections spaced by a spacing portion and bilaterally stopped by the threaded shank of said tightening up screw.

3. The laser sight mounting device of claim 1 wherein said second spring plate comprises a plurality of upward projections respectively hooked on the flash attachment of said mounting block at the back, a downward flange hooked on the flash attachment of said mounting block at the front, two curved portions bilaterally stopped inside the flash attachment of said mounting block to hold down said second spring plate in position, and a through hole, which receives the contact on the mounting foot of the electronic flash.

* * * * *